US011030613B2

(12) United States Patent
Martinez de Velasco Cortina et al.

(10) Patent No.: US 11,030,613 B2
(45) Date of Patent: *Jun. 8, 2021

(54) SYSTEMS AND METHODS FOR MANAGING AN ACCOUNT

(71) Applicant: Neology, Inc., San Diego, CA (US)

(72) Inventors: Francisco Martinez de Velasco Cortina, La Jolla, CA (US); Joe Mullis, San Diego, CA (US); Manfred Rietzler, San Diego, CA (US); Sheshi Nyalamadugu, San Diego, CA (US); Rodolfo Monsalvo, San Diego, CA (US)

(73) Assignee: NEOLOGY, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,557

(22) Filed: Apr. 7, 2020

(65) Prior Publication Data
US 2020/0234280 A1 Jul. 23, 2020

Related U.S. Application Data

(63) Continuation of application No. 15/847,673, filed on Dec. 19, 2017, now Pat. No. 10,621,571, which is a (Continued)

(51) Int. Cl.
G06Q 20/32 (2012.01)
G06Q 20/28 (2012.01)
(Continued)

(52) U.S. Cl.
CPC ..... G06Q 20/3278 (2013.01); G06K 19/0723 (2013.01); G06K 19/0724 (2013.01);
(Continued)

(58) Field of Classification Search
CPC .. G06Q 20/3278; G06Q 20/351; G06Q 20/36; G06Q 20/3227; G06Q 20/342;
(Continued)

(56) References Cited

U.S. PATENT DOCUMENTS 5,464,011 A 11/1995 Bridge
5,940,006 A 8/1999 MacLellan et al.
(Continued)

FOREIGN PATENT DOCUMENTS

JP 5464011 A 1/1979
KR 1020110116886 A 10/2011
WO 2011146492 A2 11/2011

OTHER PUBLICATIONS

International Search Report for and Written Option for PCT/US2014050973, dated Oct. 29, 2014, 6 pages.
(Continued)

Primary Examiner — Seung H Lee
(74) Attorney, Agent, or Firm — Procopio, Cory, Hargreaves & Savitch LLP

(57) ABSTRACT

An account is managed using information read from a dual frequency transponder. Information stored on the dual frequency transponder can be read by a NFC-enabled device and by a UHF RFID reader. The information links, corresponds, or otherwise provides access to account information stored at a remote server. For example, a NFC-enabled device can read the information from the dual frequency transponder and use that information to enable instant and on-the-spot recharging of a toll account. In addition, a UHF RFID toll reader can scan information from the dual frequency transponder and use that information to debit toll charges from the correct toll account. The dual frequency transponder can be embedded in a license plate and read using a reader placed in the road. Additionally, the transpon-
(Continued)

der can be configured to function at the correct frequency only when a valid vehicle registration sticker is applied to the license plate.

17 Claims, 11 Drawing Sheets

Related U.S. Application Data continuation of application No. 15/167,829, filed on May 27, 2016, now Pat. No. 9,852,421, which is a continuation of application No. 14/459,299, filed on Aug. 13, 2014, now Pat. No. 9,355,398.

(60) Provisional application No. 61/865,600, filed on Aug. 13, 2013.

(51) Int. Cl.
| | |
|---|---|
| *G06K 19/07* | (2006.01) |
| *G06Q 50/30* | (2012.01) |
| *G06Q 20/34* | (2012.01) |
| *G06Q 20/36* | (2012.01) |
| *G07B 15/06* | (2011.01) |
| *G06K 19/077* | (2006.01) |

(52) U.S. Cl.
CPC ....... *G06K 19/07794* (2013.01); *G06Q 20/28* (2013.01); *G06Q 20/3227* (2013.01); *G06Q 20/342* (2013.01); *G06Q 20/349* (2013.01); *G06Q 20/351* (2013.01); *G06Q 20/352* (2013.01); *G06Q 20/36* (2013.01); *G06Q 20/363* (2013.01); *G06Q 50/30* (2013.01); *G07B 15/063* (2013.01)

(58) Field of Classification Search
CPC .. G06Q 20/349; G06Q 20/352; G06Q 20/363; G06Q 20/28; G06Q 50/30; G06K 19/0723; G06K 19/07794; G06K 19/0724; G07B 15/063

See application file for complete search history.

(56) References Cited

U.S. PATENT DOCUMENTS

| | | | |
|---|---|---|---|
| 6,259,367 B1 | 7/2001 | Klein | |
| 6,653,946 B1 | 11/2003 | Hassett | |
| 8,095,154 B1 | 1/2012 | Wang et al. | |
| 9,355,398 B2 | 5/2016 | Martinez de Velasco Cortina | |
| 9,852,421 B2 * | 12/2017 | Martinez de Velasco Cortina | ..... G06Q 20/36 |
| 10,621,571 B2 * | 4/2020 | Martinez de Velasco Cortina | ..... G06Q 20/36 |
| 2004/0089707 A1 | 5/2004 | Cortina et al. | |
| 2005/0010478 A1 | 1/2005 | Gravelle | |
| 2005/0187882 A1 | 8/2005 | Sovio et al. | |
| 2005/0222961 A1 | 10/2005 | Staib et al. | |
| 2005/0289061 A1 | 12/2005 | Kulakowski et al. | |
| 2006/0229978 A1 | 10/2006 | Popovic et al. | |
| 2006/0278704 A1 | 12/2006 | Saunders et al. | |
| 2007/0109208 A1 | 5/2007 | Turner | |
| 2007/0176779 A1 | 8/2007 | Braunstein | |
| 2007/0285256 A1 | 12/2007 | Batra | |
| 2008/0061151 A1 | 3/2008 | Phillips | |
| 2008/0084275 A1 | 4/2008 | Azevedo et al. | |
| 2008/0126929 A1 | 5/2008 | Bykov | |
| 2008/0314971 A1 | 12/2008 | Faith et al. | |
| 2009/0021379 A1 | 1/2009 | Zhu et al. | |
| 2009/0174365 A1 | 7/2009 | Lowenthal et al. | |
| 2009/0262716 A1 | 10/2009 | Kawakami | |
| 2010/0112964 A1 | 5/2010 | Yi et al. | |
| 2011/0013491 A1 | 1/2011 | Fujisawa | |
| 2012/0019363 A1 | 1/2012 | Fein | |
| 2012/0024947 A1 | 2/2012 | Naelon | |
| 2012/0111950 A1 | 5/2012 | Worrall et al. | |
| 2012/0323767 A1 | 12/2012 | Michael | |
| 2013/0103519 A1 | 4/2013 | Kountotsis et al. | |
| 2013/0119135 A1 | 5/2013 | Gauthier et al. | |
| 2013/0332353 A1 | 12/2013 | Aidasani et al. | |
| 2014/0232518 A1 | 8/2014 | Stoehr | |
| 2015/0039494 A1 | 2/2015 | Sinton et al. | |
| 2015/0048159 A1 | 2/2015 | Martinez de Velasco Cortina et al. | |
| 2015/0135336 A1 | 5/2015 | Arasavelli et al. | |

OTHER PUBLICATIONS

Extended European Search Report for EP 14836230.4, dated Jan. 4, 2017, 7 pages.
Extended European Search Report for EP16777505.5 dated Sep. 26, 2018, 7 pages.
European Exam Report for corresponding EP Application 16777505.5 dated May 14, 2019 (4 pages).
Office Action and Exam Report for EP14836230.4 dated Jul. 2, 2019, (6 pages).
Extended European Search Report for corresponding EP Application 19199371.6 dated Nov. 20, 2019 (8 pages).
Extended European Search Report for corresponding EP Application 20180852.4 dated Jan. 13, 2021 (10 pages).
Cadamuro. "A complete range of dual frequency RFID cards from SAG." Retrieved from the Internet: URL: http://www.veryfields.net/dual-frequency-rfid-cards-uhf-hf-lf-sag (retried on Dec. 15, 2020). Feb. 21, 2012. 2 pages.

* cited by examiner

SYSTEMS AND METHODS FOR MANAGING AN ACCOUNT

RELATED APPLICATION INFORMATION

This application is a Continuation of U.S. application Ser. No. 15/847,673 filed on Dec. 19, 2017 which in turn is a Continuation of U.S. application Ser. No. 15/167,829 filed on May 27, 2016, now Issued U.S. Pat. No. 9,852,421 which is a Continuation of Ser. No. 14/459,299, filed on Aug. 13, 2014, now Issued U.S. Pat. No. 9,355,398 which claims the benefit under 35 U.S.C. § 119(e) to U.S. Provisional Patent Application No. 61/865,600, filed Aug. 13, 2013, which is incorporated herein by reference in its entirety as if set forth in full.

BACKGROUND

1. Technical Field

The embodiments described herein are related to radio frequency identification (RFID) applications, and more specifically to applications that allow for improved management and recharging of prepaid accounts.

2. Related Art

RFID is a technology that allows companies to develop applications in a variety of areas. At its core, RFID is a technology that allows for the identification of objects or people and to communicate information related to associated objects or people. Some of the major areas that RFID is enabling new applications include asset tracking, companies can put RFID tags on assets that are lost or stolen often, that are underutilized or that are just hard to locate at the time they are needed; manufacturing, RFID has been used in manufacturing plants for more than a decade. It's used to track parts and work in process and to reduce defects, increase throughput and manage the production of different versions of the same product; supply chain management, RFID technology has been used in closed loop supply chains or to automate parts of the supply chain within a company's control for years; payment systems, one of the most popular uses of RFID today is to pay for road tolls without stopping; and security and access control, RFID has long been used as an electronic key to control who has access to office buildings or areas within office buildings. There are also numerous other types of applications such as animal or human tracking and identification, electronic passports, border crossing, library applications, An RFID system comprises one or more tags or transponders that are somehow associated with an object or objects, and one or more readers or interrogators configured to read information out of the tag. The reader reads information by broadcasting a Radio Frequency (RF) signal over certain range. When a tag is within range of the reader and receives the signal, it can reflect that signal back to the reader in order to communicate with the reader. In order to communicate, the reader may put certain commands on the RF signal, and the tag can respond by putting information stored in the tag onto the signal that is reflected back to the reader.

RFID systems can employ various types of technology including active technology, semi-active technology and passive technology. Active and semi-active systems include a battery within the tag. In passive systems, no battery is included in the tag. Rather, the tag receives all the energy it needs from the received RF signal. Because passive tags do not include a battery, they can be made smaller, are less expensive than active or semi-active tags, and can also provide much more flexibility to design tags to meet various application and environmental requirements. While passive tags typically cannot communicate over as long a distance, the size, cost, and flexibility provided by passive tags make them much more attractive for many applications.

RFID systems can also operate over many frequency ranges and in accordance with several communication protocols. A couple of the most common frequency ranges are the High Frequency (HF) band (13.56 MHz) and Ultra-High Frequency (UHF) band (865-928 MHz). HF systems can operate over shorter ranges, e.g., 10 cm-1 m, and at lower data rates, whereas the UHF systems can operate over longer ranges 1-12 m, and at higher data rates.

Near Field Communication (NFC) systems are examples of HF systems. NFC is a set of standards for smartphones and similar devices to establish radio communication with each other by touching them together or bringing them into proximity, usually no more than a few inches. Present and anticipated applications include contactless transactions, data exchange, and simplified setup of more complex communications such as Wi-Fi. Communication is also possible between an NFC device and an unpowered NFC chip in a tag.

NFC standards cover communications protocols and data exchange formats, and are based on existing radio-frequency identification standards including ISO/IEC 14443 and FeliCa. The standards include ISO/IEC 18092[4] and those defined by the NFC Forum, which was founded in 2004 by Nokia, Philips and Sony, and now has more than 160 members. The Forum also promotes NFC and certifies device compliance. It fits the criteria for being considered a personal area network.

NFC builds upon RFID systems by allowing two-way communication between endpoints, where earlier systems such as contact-less smartcards were one-way only. NFC devices can also be used in contactless payment systems, similar to those currently used in credit cards and electronic ticket smartcards, and allow mobile payment to replace or supplement these systems. For example, Google Wallet allows consumers to store credit card and store loyalty card information in a virtual wallet and then use an NFC-enabled device at terminals that accepts, for example, MasterCard PayPass transactions. The NFC Forum also promotes the potential for NFC-enabled devices to act as electronic identity documents and keycards. As NFC has a shorter range and supports encryption, it is generally better suited than earlier, less private RFID systems for exchanging sensitive data such as personal finance and identification.

While there are many uses for HF technologies such as NFC, UHF technologies typically support longer range communication and higher data rates. Thus, UHF technology tends to excel in applications that include but is not limited to tolling and electronic vehicle registration, asset supervision, and supply chain management.

SUMMARY

A RFID system comprising a dual frequency RFID transponder.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1A:
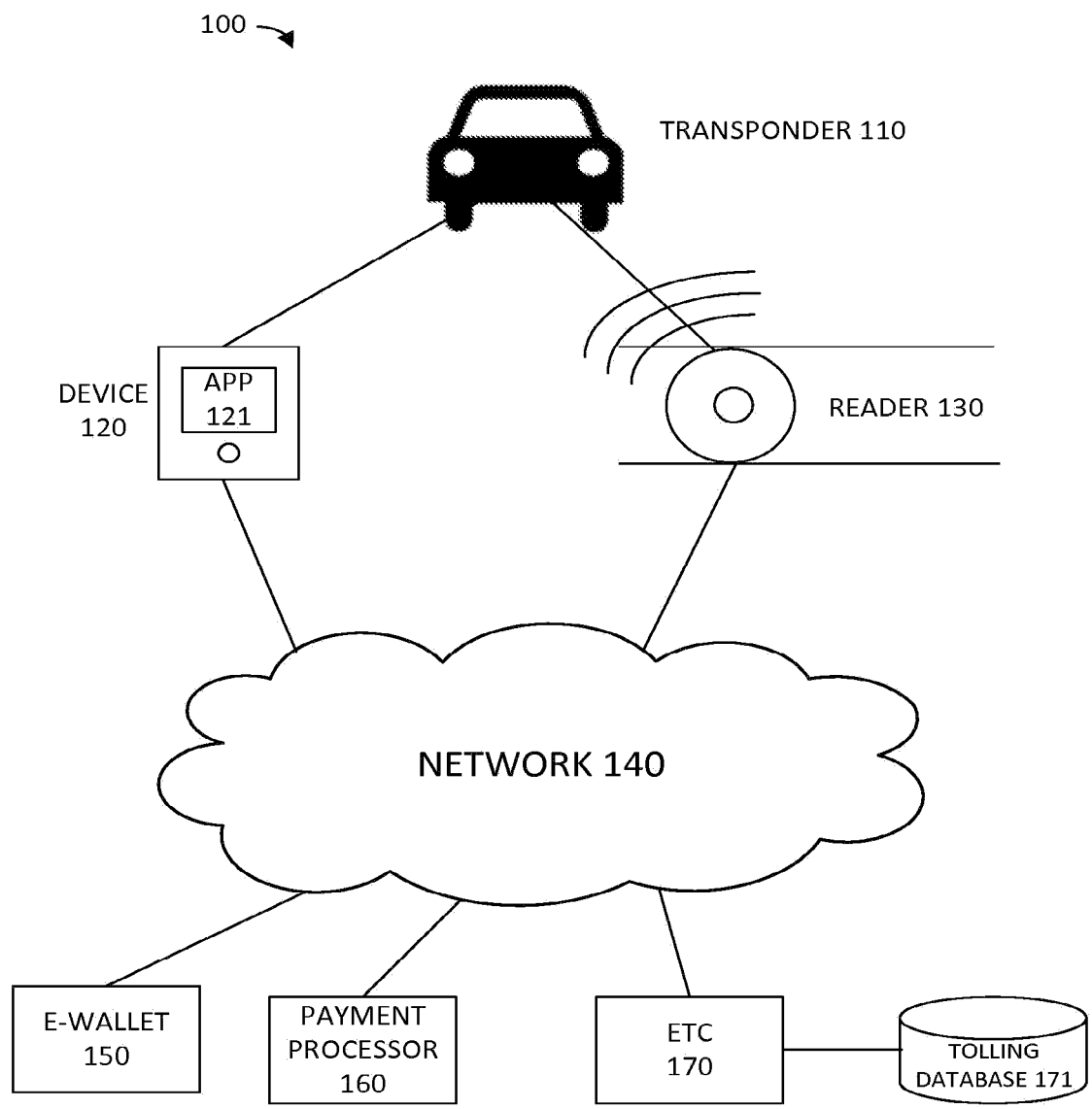
FIG. 1A illustrates a system for managing an account according to various embodiments.

The embodiments disclosed herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these example embodiments, or any other implementations, may be referred to as techniques. In general, the order of the steps of disclosed processes may be altered. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of operation. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the systems and methods described herein are directed toward applications for a multi-frequency transponder. In particular, the various embodiments of the systems and methods described herein are directed toward applications for a dual frequency transponder that incorporates both UHF and HF capabilities, and is therefore able to operate over both the UHF band (e.g., 865-928 MHz) and the HF band (e.g., 13.56 MHz).

U.S. Provisional Patent Application Ser. No. 61/811,649, entitled 'Systems and Methods for Connecting People with Product Information," filed Apr. 12, 2013, describes one application for a dual frequency transponder. Meanwhile, the various embodiments of the systems and methods described herein are directed toward applying the dual frequency transponder to streamline electronic prepayment routines and practices. In particular, in various embodiments, a dual frequency transponder is used to enable immediate and on-the-spot prepayment of road tolls enforced through Electronic Toll Collection (ETC) systems. Although embodiments of the systems and methods described herein are with respect to applications for a dual frequency transponder in electronic toll collection, it is to be understood that there are numerous other possible applications of a dual frequency transponder. For example, other applications for a dual frequency transponder include but are not limited to parking access, customs and border control, and electronic vehicle registration (EVR).

ETC systems eliminate traffic delays on toll roads by automating toll collection and obviating protracted stops at manual toll booths. Although a few ETC systems allows toll charges to be postpaid (i.e., billed to users periodically and/or a later date), by far the most common ETC billing mechanism is to automatically deduct the toll charges from prepaid debit accounts. Generally, an ETC system must first identify a passing vehicle before it can electronically debit the account of registered vehicle owner. For vehicle identification, most ETC systems operating today (e.g., E-ZPass®) rely on RFID technology. More specifically, most ETC systems issue RFID transponders or tags that are then registered or activated to link to specific vehicle owner accounts. For instance, in order for a user, Alice, to gain access to an ETC service, she will initially have to set up a toll account with an appropriate transit or toll authority (e.g., FasTrak® in the San Francisco Bay Area), and then carry a registered or activated RFID transponder in or on her vehicle. Meanwhile, most toll plazas have RFID reader equipment installed on at least some toll gates. As Alice's vehicle passes through a toll gate on the San Francisco-Oakland Bay Bridge, the onboard FasTrak® transponder communicates to a RFID toll reader a unique radio signature identifying the vehicle. Based on this unique radio signature, the ETC system can then determine the account (i.e., Alice's) from which to deduct the amount of the toll.

Some prepaid toll accounts are set up to be automatically replenished whenever the balance falls below a certain threshold. For example, if Alice subscribes to a FasTrac® credit card account, a replenishment amount equaling her average monthly usage (determined based on the previous 90 days of use) is charged to the credit card linked to the account whenever the account's balance falls below a threshold of $15. Most users, however, want autonomy over their prepaid toll account balances and would prefer to recharge their prepaid toll account at their own discretion. Control over when and how much to recharge a toll account is especially attractive to users who incur toll charges on an infrequent, intermittent, or irregular basis.

Nevertheless, current technology still imposes drastic limitations on when and where users can recharge prepaid toll accounts. Generally, recharging can only be performed at designated Point of Sale (POS) stations (e.g., convenient store, ATM). As such, users are required to take a number of proactive measures (e.g., check toll account status or balance, find a POS station) well in advance of crossing a toll road since recharging cannot be done instantaneously and on-the-spot. In practice, many users will fail to check their account balance beforehand and won't realize that their account balance is insufficient until they are at or near a toll gate where, absent any POS stations, they must then resort to time consuming manual toll transactions.

One primary reason why current technology falls short is that the conventional toll transponders in use today are single frequency devices. The E-ZPass® transponder, for instance, operate over only a single UHF (i.e., 915 MHz) band. Conventional toll transponders are designed to communicate only with the UHF RFID readers at toll gates. Consequently, only UHF RFID toll readers can gain access to the information stored on conventional toll tags. In contrast, the various embodiments of the systems and methods described herein are directed toward a dual frequency transponder. In various embodiments, Near Field Communication (NFC) technology is integrated with a UHF transponder. The resulting dual frequency transponder, in various embodiments, is capable of communicating with NFC-enabled devices as well as UHF RFID readers. In various embodiments, when implemented as a toll transponder for use in an ETC system, the dual frequency transponder can communicate with both a user's NFC-enabled device (e.g., smartphone) and the typical UHF RFID reader equipment found at toll gates.

Since Nokia introduced the first NFC-enabled phone in 2006, a steady stream of phones with NFC capabilities (e.g., Samsung Nexus™, Motorola Droid) have been marketed and sold. As a result, a growing number of users have a portable NFC reader constantly ready at their disposal. An NFC-enabled smartphone is equipped with an embedded NFC reader module that can communicate with other NFC devices, including but not limited to other NFC-enabled smartphones, NFC POS terminals, and NFC transponders and tags. Unlike other wireless technologies such as Bluetooth®, which generally require manual device discovery and/or pairing, two NFC devices can detect and automatically initiate a connection with one another as soon as they are within range (e.g., 4 cm or less). For example, an unlocked Google Android® smartphone will scan for NFC tags, analyze any discovered NFC tags, categorize data from the NFC tags, and then launch the appropriate application(s) to handle each NFC tag.

Prepaid Account Recharging Solution

FIG. 1A illustrates a system 100 for managing an account according to various embodiments. Referring to FIG. 1A, the system 100 includes a transponder 110. In various embodiments, the transponder 110 is a dual frequency transponder that communicates with a device 120 and a reader 130 using different frequency bands. In some embodiments, the transponder 110 is a dual frequency transponder that can operate over both the HF and UHF band. As will be described in more detail below, in some embodiments, the transponder 110 can be embedded, integrated, or otherwise included in a vehicle license plate. However, it is to be understood that multiple other embodiments of the transponder 110 are possible, including, for example, but not limited to, a sticker (e.g., a self-adhesive decal that can be placed on an automobile window, windshield, or license plate), a clamshell card, and an encapsulated device (e.g., in the housing of a rear-view mirror, headlights or taillights, the vehicle's front or rear bumpers, or in any non-conductive component of the vehicle). In some embodiments, the transponder 110 may be an active or semi-active device that relies on a built-in power source (e.g., batteries) to transmit its signals. In other embodiments, the transponder 110 may be a passive device that collects energy from interrogating signals from the device 120 and the reader 130.

As shown in FIG. 1A, in various embodiments, the transponder 110 communicates with the device 120. In various embodiments, the device 120 may be an NFC-enabled device (e.g., Android® smartphone) and the transponder 110 may communicate with the device 120 using the HF band. Meanwhile, in various embodiments, the transponder 110 may also communicate with the reader 130. In various embodiments, the reader 130 may be a UHF RFID reader device and the transponder 110 may communicate with the reader 130 using the UFH band. In particular, in various embodiments, the reader 130 can be a type of RFID reader device that is typically installed at an electronic toll gate. However, as will be described in more detail below, in embodiments where the transponder 110 is integrated, embedded, or otherwise included in a license plate, the reader 130 may preferably be placed in the road, underneath passing vehicles as opposed to in an overhead gantry.

In various embodiments, the device 120 communicates with the transponder 110 in order to manage a toll account, and to recharge the toll account instantaneously and on-the-spot. As shown in FIG. 1A, an application 121 is installed on the device 120. In various embodiments, interactions between the transponder 110 and the device 120 may trigger or activate the application 121. For example, in one embodiment, touching or tapping the transponder 110 and the device 120 together may launch the application 121 on the device 120. Alternately, in some embodiments, the application 121 may launch when the device 120 is brought within close proximity of the transponder 110. In various embodiments, interactions between the transponder 110 and the device 120 may further allow the device 120 to scan, read, or otherwise retrieve information stored on the transponder 110. For example, in one embodiment, by touching, tapping, or otherwise positioning the transponder 110 and the device 120 together, the device 120 may be able to read the information that is stored on the transponder 110. In various embodiments, the device 120 may determine to launch the application 121 automatically based on at least some of the information read from the transponder 110. In some embodiments, instead of gaining access to all of the information stored on the transponder 110 at once, interaction between the device 120 and the transponder 110 may initiate an authentication process. In some embodiments, before the device 120 is able to access, for example, prepaid toll account information, a user may be required to provide the proper credentials (e.g., biometrics, username, password).

In various embodiments, at least some of the information stored on the transponder 110 may identify, link, or otherwise provide access to a corresponding prepaid toll account. As will be described in more detail below, in various embodiments, the application 121 is able to use at least some of the information read from the transponder 110 to obtain information associated with the toll account, including, for example, but not limited to, an account status and account balance. As shown in FIG. 1A, the application 121 may communicate with an ETC server 170 over a network 140. In various embodiments, the network 140 may comprise one or more of a wired network, a wireless network, a local area network, a wide area network, the Internet, or any other appropriate network. In some embodiments, the application 121 may use web or application services provided by the ETC server 170 in order to obtain prepaid toll account information (e.g., account status, account balance). Thus, in some embodiments, by activating the application 121 through interactions between the transponder 110 and the device 120 (e.g., touch, tap), a user can gain immediate access to current prepaid toll account information (e.g., status, balance).

In various embodiments, the application 121 may additionally provide a user interface for recharging a toll account. For instance, in some embodiments, the application 121 may provide one or more graphic user interface (GUI) components (e.g., text areas or fields, radio buttons, checkboxes, drop-down menu) allowing a user to select or enter one or more inputs including, for example, but not limited to, a recharge amount, a payment method (e.g., a credit card selection), and security or authentication credentials for the virtual wallet. In various embodiments, the application 121 may be integrated with a virtual wallet (e.g., Google Wallet™) on the device 120. As will be described in more detail below, in various embodiments, the application 121 may interact with the virtual wallet (e.g., Google Wallet™) to replenish the user's prepaid toll account.

As shown in FIG. 1A, in various embodiments, in addition to the ETC server 170, the application 121 may also communicate with both an electronic wallet (E-Wallet) server 150 and a payment processor server 160 over the network 140. In some embodiments, the application 121 may request payment information (e.g., a credit card number) from the E-Wallet server 150 so that the application 121 may then request payment processor server 160 to submit an appropriate recharge amount to the ETC server 170 replenishing the user's prepaid toll account. Advantageously, in various embodiments, a prepaid toll account may be managed and replenished instantaneously and on-the-spot. For instance, in various embodiments, a user is no longer required to seek out a POS station but can instead recharge his or her prepaid toll account while on the road and from inside the vehicle.

In various embodiments, the transponder 110 may also communicate with the reader 130. In various embodiments, the reader 130 comprises a UHF RFID reader that is capable of reading information stored on the transponder 110 using the UHF (865-928 MHz) band. As shown in FIG. 1A, in various embodiments, the reader 130 may be an RFID reader installed at a toll gate. Furthermore, as FIG. 1A shows, the reader 130 may communicate with the ETC server 170 over the network 140. In some embodiments, information that the reader 130 reads from the transponder 110 may be transmitted to the ETC server 170 via the network 140. As will be described in more detail below, in various embodiments, information stored on the transponder 110 can link, correspond, or otherwise provide access to other information, such as information that is stored elsewhere and remotely on a network server. For example, in various embodiments, the ETC server 170 may use the information read from the transponder 110 to identify a vehicle and to apply a toll charge to an account associated with the vehicle.

Figure 1B:
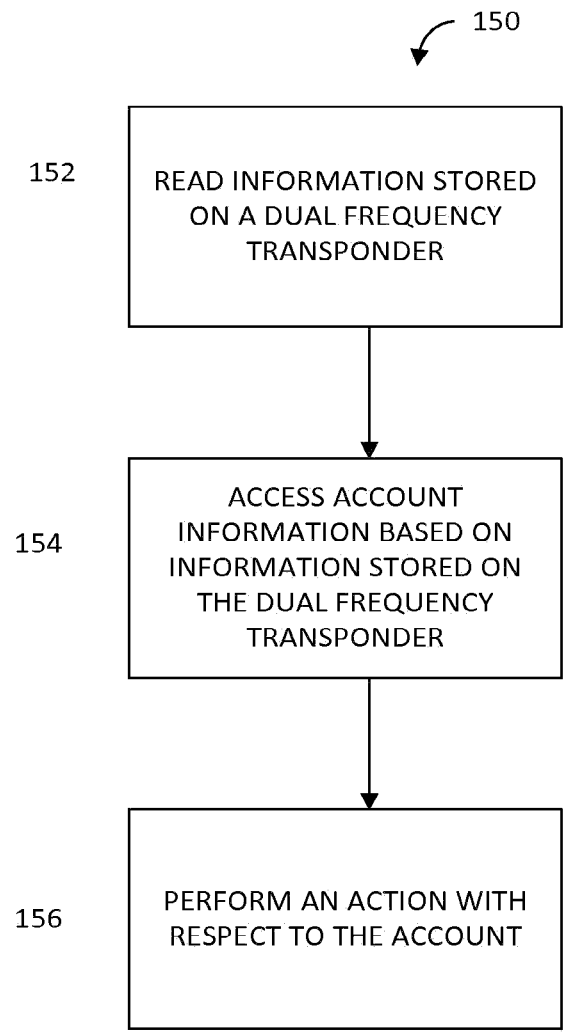
FIG. 1B is a flowchart illustrating a process for managing an account according to various embodiments.

FIG. 1B is a flowchart illustrating a process 150 for managing account according to various embodiments. In various embodiments, the process 150 may be triggered as a result of interactions between the transponder 110 and the device 120 described with respect to FIG. 1A.

At 152, at least some of the information stored on a dual-frequency transponder is accessed. For example, as described with respect to FIG. 1A, an NFC-enabled device such as the device 120 (e.g., Android® smartphone) is able to read the information stored on the transponder 110. In some embodiments, at last some of the information read from the transponder 110 may trigger the launch of the application 121 on the device 120. In addition, a UHF RFID toll reader such as the reader 130 may also be able to read some or all of the information stored on the transponder 110.

At 154, account information is accessed based on the information stored on the dual-frequency transponder. In various embodiments, at least some of the information stored on the transponder 110 may link, correspond, or otherwise provide access to account information. In various embodiments, the information stored on the transponder 110 may link, correspond, or otherwise provide access to account information that is stored at a remote server (e.g., the ETC server 170). In some embodiments, the information stored at the remote server includes prepaid toll account information including, for example, but not limited to, account status and account balance.

At 156, at least one action is performed with respect to the account. For example, in some embodiments, the action may include, for example, but not limited to, communicating the account information stored at the remote server (e.g., account status, account balance) to a user of the device 120 via the application 121. As another example a type of action that can be performed with respect to the account, the user of the device 120 may also use the application 121 to recharge the toll account. As will be described in more detail below, the user of the device 120 may replenish the toll account through a virtual wallet that may be integrated with the application 121. Finally, in some embodiments, a UHF RFID toll reader may also able to read the information stored on the transponder 110. In various embodiments, the UHF RFID toll reader can be configured to provide some or all of this information to an ETC system (e.g., the ETC server 170). In various embodiments, based on information scanned from the dual-frequency transponder by the UHF RFID toll reader, the ETC system may be able to determine the account from which to deduct a toll charge.

Recharging with a Virtual Wallet

As described earlier with respect to FIG. 1A, various embodiments of the systems and methods described herein simplify and abbreviate the process to recharge a toll account. For instance, in various embodiments, the recharging process may be initiated by simply bringing an NFC-enabled device (e.g., the device 120) within the range of a dual frequency transponder (e.g., the transponder 110). In response, in various embodiments, the NFC-enabled device (e.g., the device 120) may launch an application (e.g., the application 121) that is integrated with a virtual wallet (e.g., Google Wallet™). Otherwise stated, in various embodiments, scanning a dual frequency toll transponder with an NFC-enabled device may trigger an application that is configured to interact directly with a virtual wallet on the NFC-enabled device. In various embodiments, the application provides a user interface for a user to select or enter various inputs (e.g., amount, credit card, credentials) to recharge a toll account. At the same time, in various embodiments, functions and features of the virtual wallet may be integrated into the application using one or more appropriate Application Programming Interfaces (APIs). For example, to enable the integration of Google Wallet™ within the application, the Android® Software Development Kit (SDK) offers the following three basic APIs: Google Wallet online commerce API, Google Wallet for digital goods API, and Google Checkout API.

Figure 2:
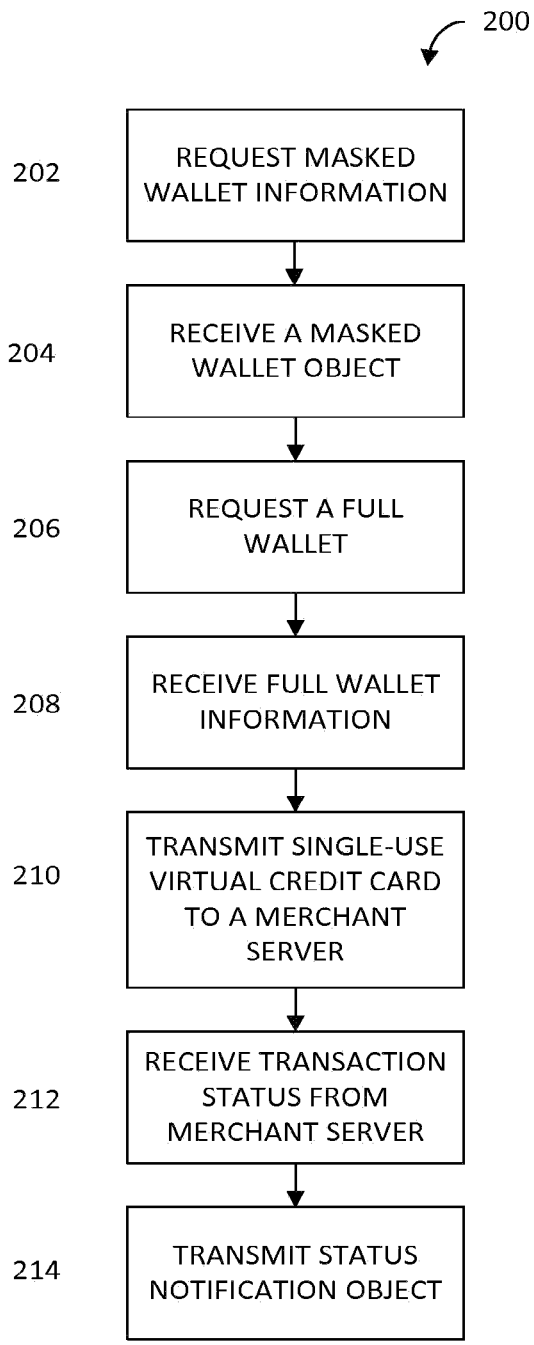
FIG. 2 illustrates an embodiment of a process for managing an account according to various embodiments.

FIG. 2 illustrates an embodiment of a process 200 for recharging a toll account using a virtual wallet. In various embodiments, the process 200 is performed by an application, such as the application 121 installed on the device 120 described with respect to FIG. 1A. In some embodiments, the process 200 may implement operation 156 of the process 100 described with respect to FIG. 1B. In one exemplary embodiment, the process 200 may be performed by an application to recharge a toll account using payment information obtained directly from Google Wallet™. In various embodiments, the application may be configured to exchange payment information with a Google Wallet™ backend server. In various embodiments, the application and the Google Wallet™ backend server exchange payment information using signed JavaScript Object Notation (JSON) data objects called JSON Web Tokens (JWTs).

In some embodiments, the application may offer users the option to recharge their prepaid toll account using Google Wallet™. Advantageously, in some embodiments, using a virtual wallet such as Google Wallet™ further expedites the recharging process since users are able to avoid manually inputting payment information (e.g., credit card number, billing address, etc.). For example, in some embodiments, after a user, Bob, indicates that he would like to recharge his prepaid toll account by adding $10 to the account, he can then select or click on a "Buy with Google" button to complete or finalize the recharging transaction almost instantaneously. In some embodiments, selecting to pay with a virtual wallet such as by clicking on the "Buy with Google" button may trigger the process 200.

At 202, masked wallet information is requested. In various embodiments, the application sends to the Google Wallet™ backend server a masked wallet request JWT. In various embodiments, masked wallet information comprises a Java object containing a masked or partially hidden version of Bob's credit card number. In some embodiments, masked wallet information can further include Bob's shipping address. At 204, a masked wallet object is received. In various embodiments, in response to the request from the application, the Google Wallet™ backend server returns to the application a masked wallet response JWT. In various embodiments, the application can display an order review page or screen to Bob based on the masked wallet information. At 206, a full wallet is requested. In various embodiments, after receiving the masked wallet object at 204, the application will then need full wallet information to complete Bob's order. As such, in some embodiments, the application then sends to the Google Wallet™ backend server a full wallet request JWT. At 208, full wallet information is received. In various embodiments, the Google Wallet™ backend server responds to the request by providing a full wallet response JWT to the application. In various embodiments, the full wallet information includes details of a single-use virtual credit card for the transaction. At 210, the single-use virtual credit card is transmitted. In various embodiments, the application passes the single-use virtual credit card provided by Google Wallet™ in the full wallet to a merchant server (e.g., the payment processor server 160 described with respect to FIG. 1A). At 212, transaction status is received. In various embodiments, the merchant server processes the payment and notifies the application of the status of the transaction (e.g., success or failure). Finally, at 214, a status notification object is transmitted. In various embodiments, based on the status notification from the merchant server (e.g., success or failure), the application then creates and sends a transaction status JWT to the Google Wallet™ backend server. In addition, in various embodiments, the application displays a confirmation screen informing Bob that $10 has been added to his prepaid toll account.

Dual Frequency Transponder Data Links

PCT Application No. PCT/EP2012/001765, entitled "Method and Apparatus for Providing and Managing Information Linked to RFID Data Storage Media in a Network", filed Apr. 25, 2012, which is incorporated herein by reference, describes the management of data that is linked to or otherwise associated with a RFID storage medium. The various embodiments of the methods and systems described herein are directed toward using a dual frequency transponder to manage and replenish a toll account. In the various embodiments described herein, the dual frequency transponder can communicate with both a NFC-enabled device and a UHF RFID reader. In various embodiments, data stored on the dual frequency transponder links, corresponds, or otherwise provide access to a toll account. Thus, in various embodiments, both NFC-enabled devices (e.g., Android® smartphones) and UHF RFID readers (e.g., common types of toll readers) are able to read or scan information that is stored on the dual frequency transponder and then perform a number of essential functions based on this information.

According to various embodiments, an account may be managed and recharged instantly and on-the-spot. In various embodiments, bringing an NFC-enabled device (e.g., the device 120) within the range of a dual frequency transponder (e.g., the transponder 110) automatically triggers the launch of an application (e.g., the application 121) on the NFC-enabled device (e.g., the device 120). In various embodiments, the application can provide current prepaid toll account information (e.g., account status, account balance). Furthermore, in various embodiments, the application may be integrated with a virtual wallet (e.g., Google Wallet™) thereby enabling a user to recharge the toll account instantly and on-the-spot. In the example described with respect to FIG. 2, Bob uses his Android® smartphone to scan a dual frequency transponder and is subsequently able to add $10 to his prepaid toll account.

In various embodiments, the information stored in the dual frequency transponder links, corresponds, or otherwise provides access to an account. In various embodiments, an NFC-enabled device reads data that is stored on an RFID data storage medium (e.g., a dual frequency transponder) and then uses this data to access additional data that is stored at a remote server. For example, in various embodiments, reading or scanning the information stored in the dual frequency transponder enables the application to access a designated memory area at a remote server (e.g., the ETC server 170). In some embodiments, the application is then able to retrieve, for example, prepaid toll account information from the remote server (e.g., the ETC server 170). Additionally, in various embodiments, the application is also able to update toll account information stored at the remote server, including, for example, but not limited to, by submitting a recharge payment that alters the status or the balance of the toll account.

Figure 3:
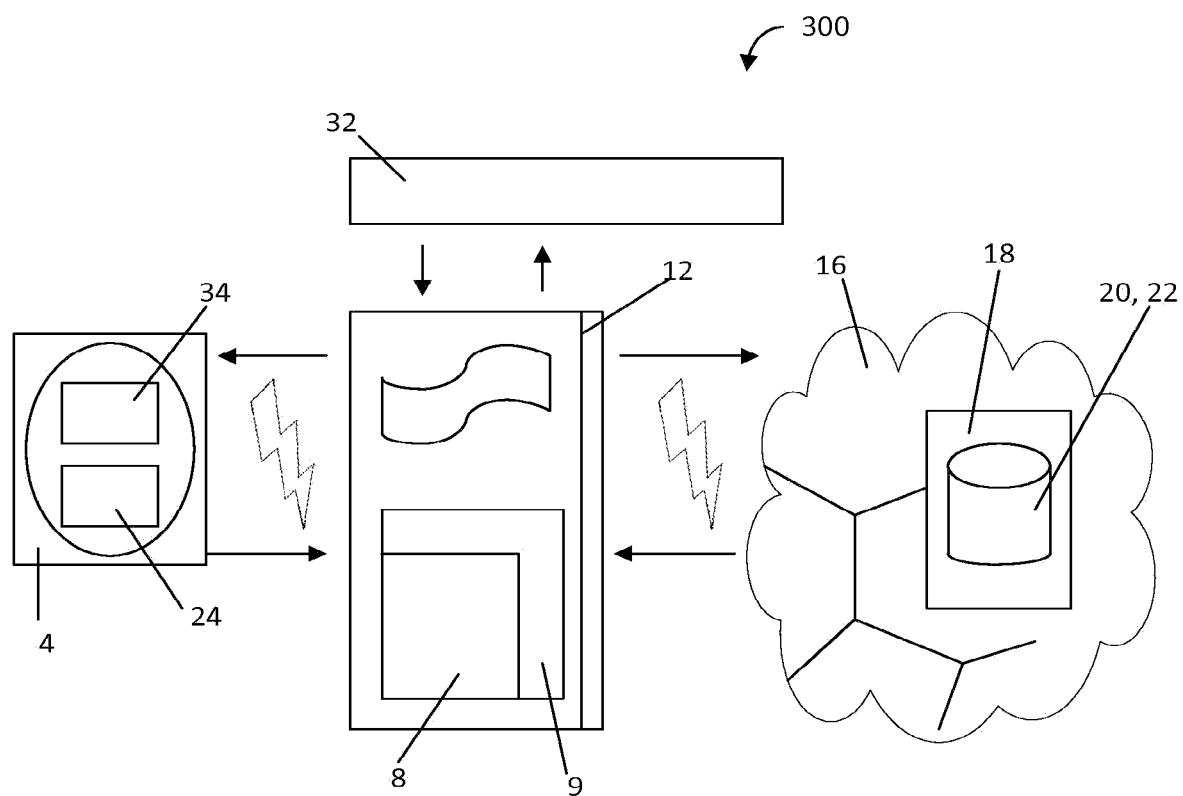
FIG. 3 illustrates a system for managing an account according to various embodiments.

FIG. 3 illustrates a system 300 for managing an account according to various embodiments. In various embodiments, a user 32 may operate a device 12, which is a NFC-enabled device such as an Android® smartphone. In various embodiments, an application 9 may be an application that permits the user 32 to manage and replenish a toll account, including by providing current account information (e.g., status, balance) and options to replenish the toll account. In various embodiments, the device 12 includes an NFC RFID reader 8 that is capable of reading data stored in an RFID storage medium 4. In various embodiments, the RFID storage medium 4 may be a dual frequency transponder such as the transponder 110 described with respect to FIG. 1A. In some embodiments, the application 9 is installed on the device 12. As such, in some embodiments, when the NFC RFID reader 8 reads or scans data from the RFID storage medium 4, the device 12 may launch the application 9 automatically based on this data. Otherwise stated, in some embodiments, the application 9 may be launched when the user 32 brings the device 12 within sufficient range of the RFID storage medium 4 for the NFC RFID reader 8 to read or scan data from the MD storage medium 4. In other embodiments, the application 9 may not be already installed on the device 12. In those embodiments, data read or scanned from the RFID storage medium 4 may direct the device 12 to a link to download and install the application 9.

As shown in FIG. 3, in various embodiments, the RFID storage medium 4 may include an RFID data record 24 and an additional memory 34. In various embodiments, the NFC RFID reader 8 may be configured to read or scan the data stored on the RFID data record 24. For example, in some embodiments, the NFC RFID reader 8 may direct a request to the RFID storage medium 4. In response, in some embodiments, the RFID storage medium 4 may release data stored on the RFID data record 24 to the NFC RFID reader 8. In some embodiments, the user 32 may be authenticated (e.g., biometrics, username, password) before the RFID storage medium 4 releases its data to the NEC RFID reader 8. In various embodiments, the application 9 may use the data released from the RFID data record 24 to generate access rights for additional data 22 stored in data memory area 20 of a remote server 18. In some embodiments, in order to generate access rights to the additional data 22, the user 32 may be required to provide one or more forms of security or authentication credentials (e.g., biometrics, username, password). In one exemplary embodiment, the remote server 18 may be a server associated with an ETC system (e.g., the ETC server 170) and the additional data 22 may include account information (e.g., account status, account balance) with respect to a toll account associated with the user 32, in various embodiments, the application 9 requests for the additional data 22 from the remote server 18 by sending, for example, access rights to the remote server 18 over a network 16. In various embodiments, in response to the request from the application 30, the remote server 18 may transmit the additional data 22 to the device 12 via the network 16. In various embodiments, the application 9 can then provide, with or without further processing or analysis, the additional data 22 to the user 32.

Dual Frequency Transponder

Figure 4:
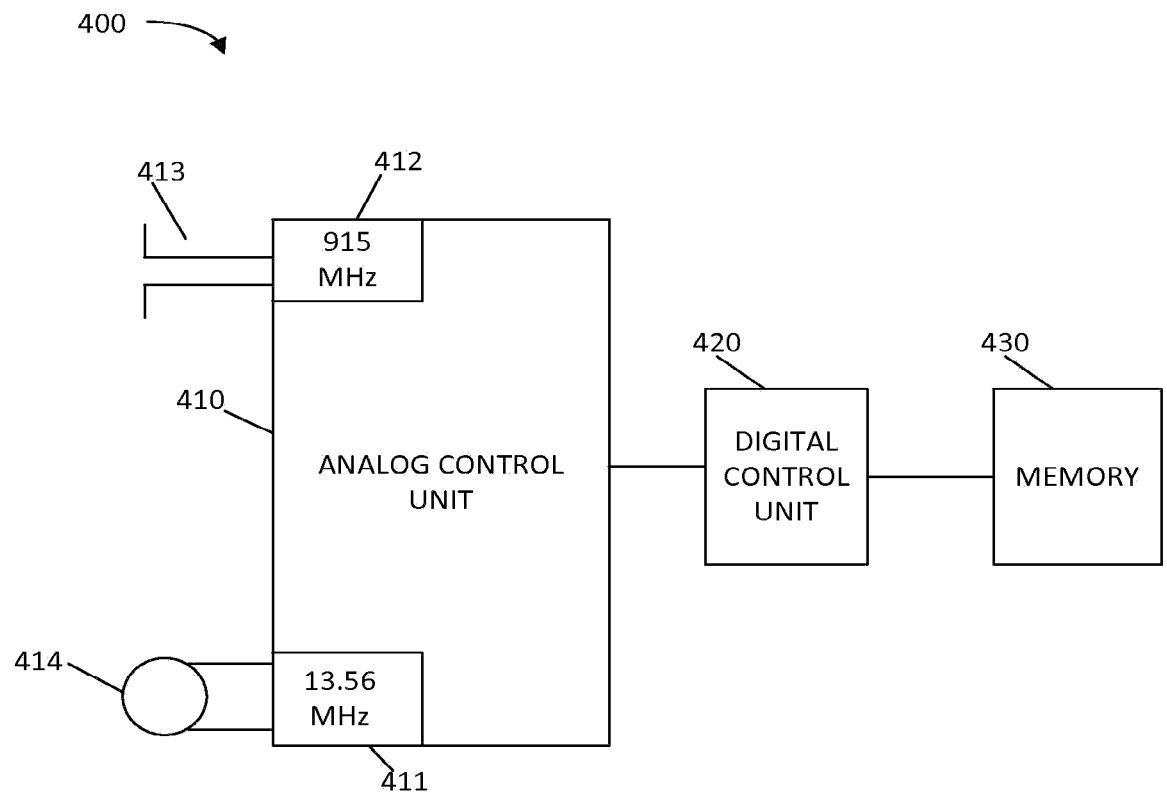
FIG. 4 is a block diagram illustrating a transponder according to various embodiments.

FIG. 4 is a block diagram illustrating a transponder 400 according to various embodiments. Referring to FIGS. 1A, 3, and 4, the transponder 400 may implement the transponder 110 described with respect to FIG. 1A and the RFID storage medium 4 described with respect to FIG. 3.

In various embodiments, the transponder 400 may be a multi-frequency or frequency-independent transponder. In various embodiments, the transponder 400 is a dual frequency transponder that operates over both the HF (e.g., 13.56 MHz) and UHF (e.g., 865-928 MHz) band. Advantageously, in various embodiments, the transponder 400 is capable of communicating with both an NFC-enabled device and a UHF RFID reader. For instance, in some embodiments, when an NFC-enabled device such as an Android® smartphone is brought within the range of the transponder 400, the NFC-enabled device can respond by automatically launching an application (e.g., the application 121 described with respect to FIG. 1A or the application 9 described with respect to FIG. 3) that enables a quick and on-the-spot recharge of a toll account. In addition, in some embodiments, a UHF RFID reader installed at a toll gate can use information scanned from the transponder 400 to determine the correct prepaid toll account from which to deduct a toll charge.

In various embodiments, the transponder 400 may include a base layer and at least one radio frequency device disposed upon the base layer. In various embodiments, the radio frequency device comprises at least one chip and at least one antenna that are in electrically coupled with the chip. In some embodiments, the transponder 400 can include a frequency-independent chip. In those embodiments, the transponder 400 can include a single manufactured silicon chip that is configured, through proper connections and match to an appropriate antenna, to operate using any of the relevant frequencies (e.g., 13.56 MHz and 915 MHz) assigned to the transponder 400. Alternately, in some embodiments, the transponder 400 may include a multi-frequency (e.g., dual frequency) chip. In those embodiments, the transponder 400 may include a chip that is designed and characterized to operate with a specific antenna at several (e.g., two) different frequencies.

As shown in FIG. 4, in some embodiments, the transponder 400 may include an analog control unit 410, which is a dual interface with a combination of two frequencies. For example, in some embodiment, the analog control unit 410 may include an HF (e.g., 13.56 MHz) system 411 and a UHF (e.g., 915 MHz) system 412, both described in more detail below. In various embodiments, the UHF system 412 may operate over the 915 MHz band and is used for communicating with UHF RFID readers, including but not limited to conventional UHF RFID toll readers. In some embodiment, the UHF system 412 may include a first antenna 413, which can be a dipole antenna.

Meanwhile, in various embodiments, the HF system 411 may operate over the 13.56 MHz band and is used for communicating with NFC-enabled devices, such as Android® smartphones. In some embodiments, the HF system 411 may include second antenna 414, which can be a coil antenna constructed from a helix of insulated wire.

In various embodiments, the transponder 400 can further include a digital control unit 420 and a memory 430. In various embodiments, the analog control unit 410 comprises a continuous-time system. That is, in various embodiments, the analog control unit 410 comprises a system that is continuous in both time and magnitude. Furthermore, in various embodiments, the analog control unit 410 may be configured to input and output analog signals. A signal is considered analog if it is defined for every point in time (i.e., continuous-time) and is able to take any real magnitude value within its range.

In contrast, in various embodiments, the digital control unit 420 comprises a discrete-time and quantized system. In various embodiments, the digital control unit 420 may accept digital input signals and produce digital output signals. A digital signal is only defined for particular points in time (i.e., discrete-time) and can only take on certain quantized values (e.g., Os and is in a binary system). In some embodiments, the analog control unit 410, the digital control unit 420, and the memory 430 may all be components on a single integrated RFID circuit chip.

Figure 5:
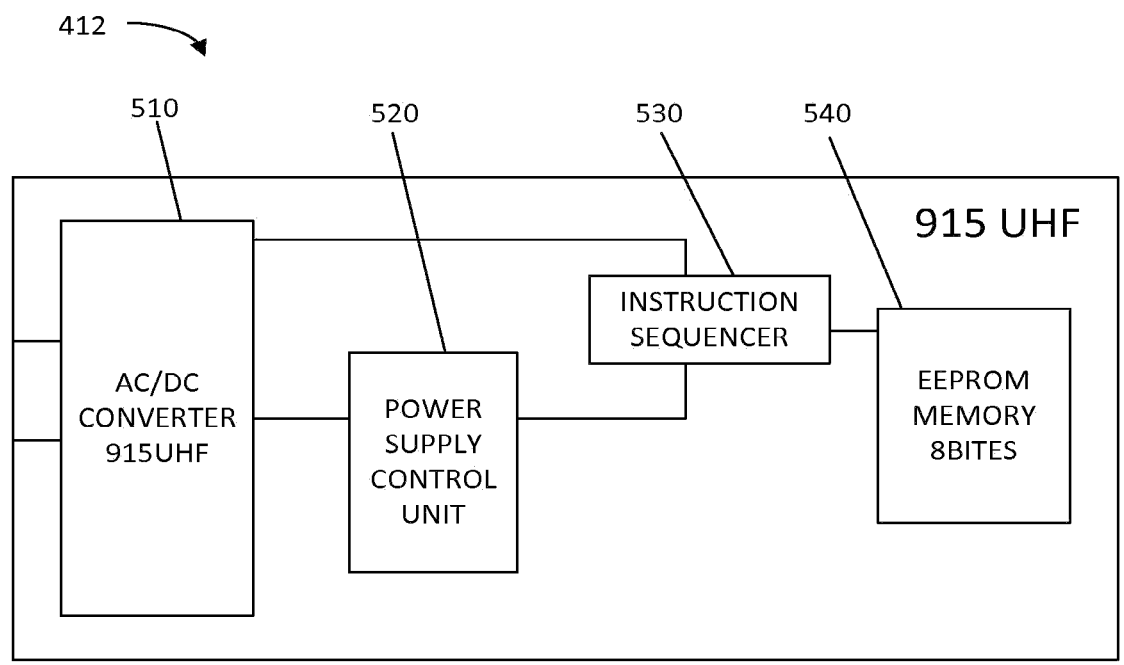
FIG. 5 is a block diagram illustrating a UHF system according to various embodiments.

FIG. 5 is a block diagram illustrating the UHF system 412 according to various embodiments. In various embodiments, in various embodiments, the UHF system 412 may be used to implement the UHF component of a dual frequency transponder, such as the transponder 110 described with respect to FIG. 1A and the RFID storage medium 4 of described with respect to FIG. 3. In various embodiments, the UHF system 412 operates over a UHF (865-928 MHz) band. As shown in FIG. 5, the UHF system 412 may use the 915 MHz or 2.45 GHz band. In various embodiments, a dual frequency transponder that incorporates the UHF system 412 is capable is interacting with a UHF RFID reader.

Many ETC systems have UHF RFID readers installed at toll gates. For instance, readers in the E-ZPass® system broadcast a 915 MHz signal while E-ZPass® transponders are configured to listen for and respond to the 915 MHz signal. In some cases, particularly where a transponder is configured to operate passively, the transponder can respond to the 915 MHz signal broadcast by a reader with a backscatter signal to the reader that conveys the data stored in the transponder. In various embodiments, data transmitted to the UHF RFID reader includes data (e.g., a unique radio signature) that links, corresponds, or otherwise provides access to the toll account associated with each passing vehicle. As such, in various embodiments, this data enables the ETC system to identify or determine the toll account to which to apply the toll charge.

As shown in FIG. 5, the UHF system 412 may include an alternating current/direct current (AC/DC) converter 510, a power supply control unit 520, an instruction sequencer 530, and a memory 540. In various embodiments, the AC/DC converter 510 may receive and convert an alternating current signal to a direct current signal. Meanwhile, in various embodiments, the power supply control unit 520 is configured to regulate voltage and current to protect the UHF system 412 fluctuations in power (e.g., power surge). In various embodiments, the instruction sequencer 530 may queue instructions that are directed to the memory 540. In various embodiments, the memory 540 may comprise an Electrically Erasable Programmable Read-Only Memory (EEPROM) storing data, such as instructions from the instruction sequencer 530.

Figure 6:
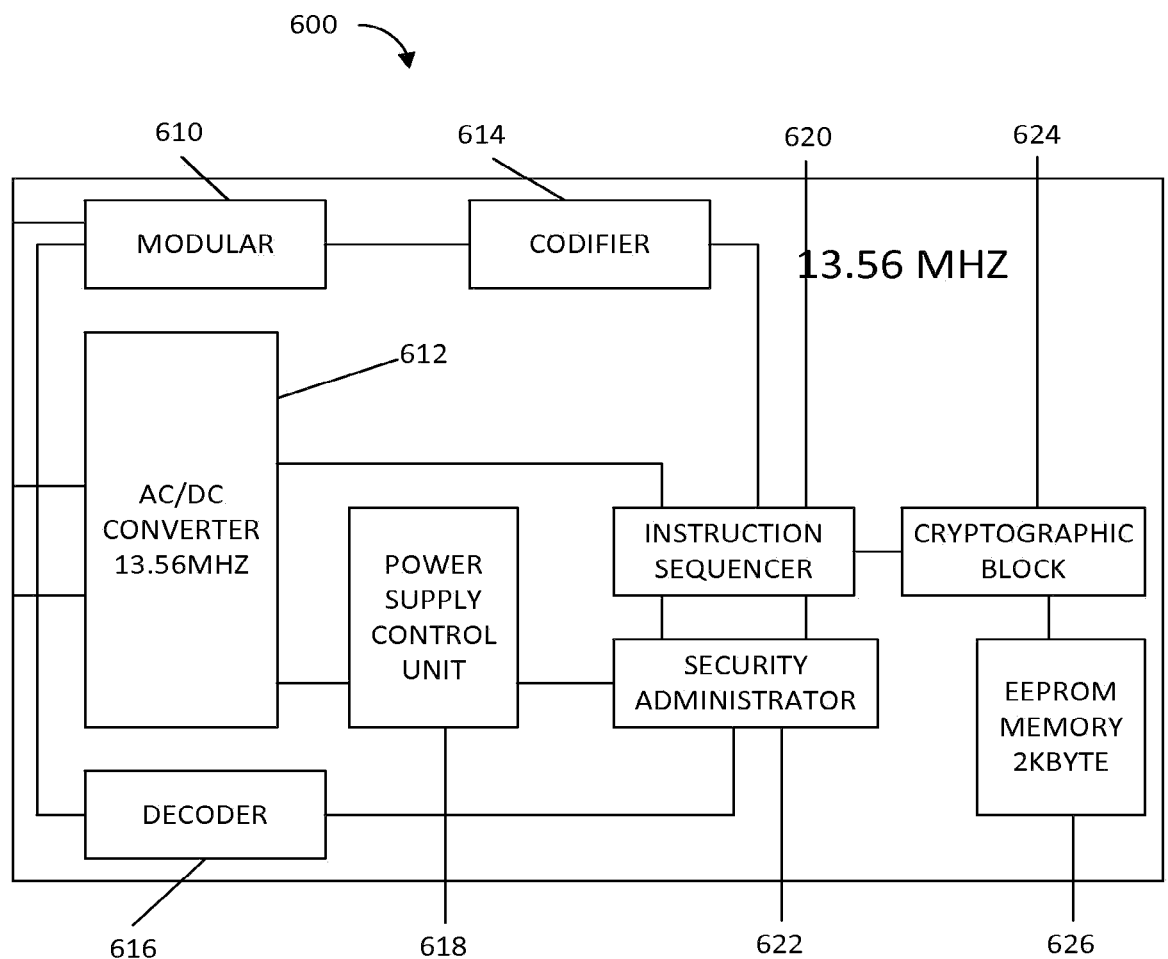
FIG. 6 is a block diagram illustrating an HF system according to various embodiments.

FIG. 6 is a block diagram illustrating the HF system 411 according to various embodiments. In various embodiments, the HF system 411 may implement the HF component of a dual frequency transponder, such as the transponder 110 described with respect to FIG. 1A and the RFID storage medium 4 described with respect to FIG. 3. As shown in FIG. 6, the HF system 411 operates in the 13.56 MHz band. In various embodiments, a dual frequency transponder that incorporates the HF system 411 is capable of interacting with a NFC-enabled device (e.g., Android® smartphone) when the dual frequency transponder touches, taps, or is otherwise brought within the range of the NFC-enabled device. For example, bringing an Android® smartphone within the range of the dual frequency transponder activates an Android Beam™ feature on the smartphone.

The Android Beam™ feature allows data to be transferred one NFC-enabled device to another NFC-enabled device via NFC. For example, in some embodiments, Android Beam™ allows data to be transferred from the dual frequency transponder to an Android® smartphone via NFC. In various embodiments, data from the dual frequency transponder triggers the launch of an appropriate application on the Android® smartphone to handle the data. In various embodiments of the systems and methods described herein, when a NFC-enabled device (e.g., Android® smartphone) reads data from a dual frequency transponder with an integrated HF component (e.g., the HF system 411), an application to recharge a toll account launches automatically. For example, in some embodiments, data read from the dual frequency transponder links, corresponds, or otherwise provide access to a toll account. In one common scenario, the toll account has a deficient balance and needs to be recharged before a corresponding vehicle can pass through an ETC toll gate. In various embodiments, the application, through integration with a virtual wallet (e.g., Google Wallet™), enables the toll account to be recharged instantly and on-the-spot.

As shown in FIG. 6, the HF system 411 includes a modulator 610, an AC/DC converter 612, a codifier 614, a decoder 616, a power supply control unit 618, an instruction sequencer 620, a security administrator 622, a cryptographic block 624, and a memory 626. In various embodiments, the modulator 610 is configured to receive baseband signals from an antenna, such as the second antenna 414 (e.g., coil antenna) described with respect to FIG. 4. In various embodiments, the AC/DC converter 612 is configured to receive and convert an AC signal to a DC signal. Meanwhile, in various embodiments, the codifier 614 is configured to encode the baseband signals received by the modulator 610 so that the signals can be utilized by another device or protocol, including the instruction sequencer 620. In various embodiments, the decoder 616 is configured to decode information from codifier 614 so that it may be used by another device or display. In various embodiments, the instruction sequencer 620 is configured to queue instructions destined for the memory 626. In various embodiments, the security administrator 622 is configured to validate the cryptographic keys sent to the cryptographic block 624. In various embodiments, one or both of the cryptographic block 624 and the memory 626 may be configured store the security keys that, for example, have been validated by the security administrator 622 and that can be used to control (e.g., grant, deny) access to the dual frequency transponder's (e.g., the transponder 400) memory or certain content therein. Finally, in various embodiments, the power supply control unit 618 is configured to regulate voltage and current in order to protect the HF system 411 from power fluctuations (e.g., power surges).

RFID-Enabled License Plate

The various embodiments of the systems and methods described herein are directed toward the use of a dual frequency transponder (e.g., the transponder 110 described with respect to FIG. 1A, the RFID storage medium 4 described with respect to FIG. 3, and the transponder 400 described with respect to FIG. 4) to manage and recharge an account. In particular, in various embodiments, the dual frequency transponder provides information that enables the application of both toll charges and reloads payments to the appropriate prepaid toll account. As the dual frequency transponder may be configured to interact both with UHF RFID toll readers and with NFC-enabled devices, the dual frequency transponder should preferably be set in a location that is convenient and accessible for scanning by both the UHF RFID toll readers and the NFC-enabled devices. Thus, according to one exemplary embodiment, it may be desirable to attach the dual frequency transponder to a vehicle associated with a toll account. As such, in some embodiments, the dual frequency transponder can be a sticker (e.g., a self-adhesive decal that can be placed on an automobile window, windshield, or license plate), a clamshell card, or an encapsulated device (e.g., in the housing of a rear-view mirror, headlights or taillights, the vehicle's front or rear bumpers, or in any non-conductive component of the vehicle).

In some embodiments, the dual frequency transponder can also be embedded in the vehicle's license plate. However, vehicle license plates are most commonly made from metal (e.g., aluminum). Direct and uninsulated contact between a transponder (single or multi-frequency) and a metal license plate (e.g., applying the transponder directly onto the metal license plate) can short or severely detune the transponder's antenna(s) (e.g., the first antenna 413 and the second antenna 414 described with respect to FIG. 4), rendering the transponder virtually unreadable. Thus, in the exemplary embodiments described in more detail below, a transponder is embedded in a metal license plate in ways that neither compromise the performance of the transponder's antenna(s) nor add undesirable bulk to the license plate's usual dimensions. In the various exemplary embodiments described in more detail below, a RFID-enabled license plate is configured to resonate at multiple frequencies (e.g., HF and UHF bands). In some embodiments, a resonator for the transponder is formed from the license plate itself if the license plate is metal. In other embodiments, whether the plate is metal or non-metal, the resonator may be formed from a metalized layer (e.g., retro-reflective material, holographic foil, or any other appropriate metallic substrate) covering the license plate.

Figure 7A:
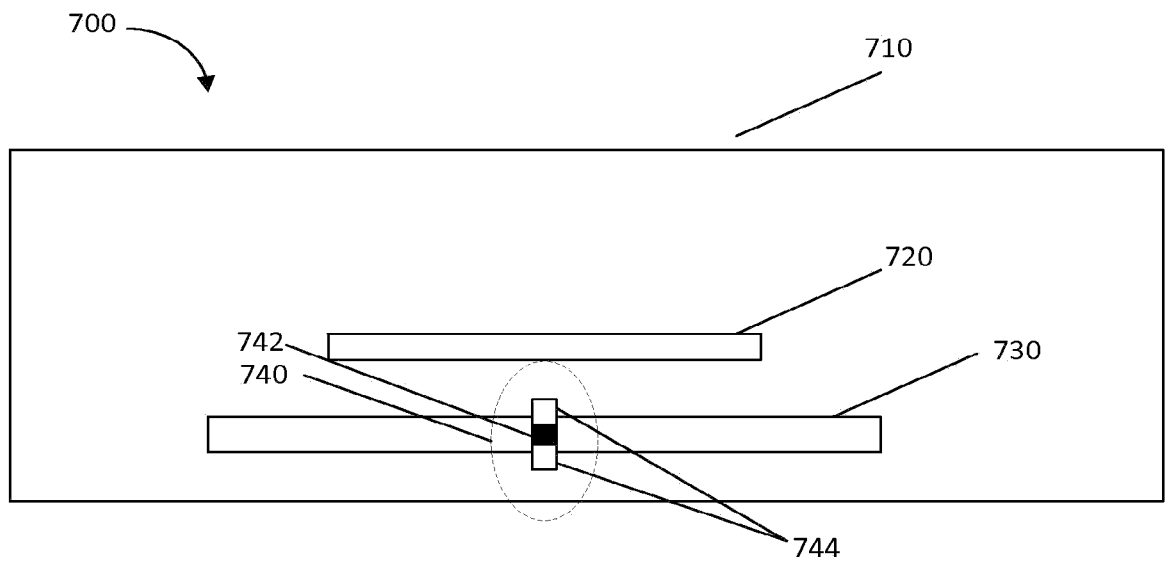
FIG. 7A illustrates the top view of an RFID-enabled license plate according to various embodiments.

FIG. 7A illustrates the top view of an RFID-enabled license plate 700 according to various embodiments. In various embodiments, the RFID-enabled license plate 700 includes a plate 710. In various embodiments, the RFID-enabled license plate 700 can be configured to include one or more slots, which are open areas that are cut or punched out of the plate 710. In some embodiments, the RFID-enabled license plate 700 can be configured to include multiple slots. As shown in FIG. 7A, in some embodiments, the RFID-enabled license plate 700 may include a first slot 720 and a second slot 730. In various embodiments, both the first slot 720 and the second slot 730 can be filled with a non-metal material. In various embodiments, the non-metal material can be stuffed, extruded, or otherwise deposited into the first slot 720 and the second slot 730. In various embodiments, the non-metal material remains flush with respect to both the front and rear surfaces of the plate 710.

Furthermore, as shown in FIG. 7A, an RFID Strap 740 can be positioned across the second slot 730 as illustrated. In some embodiments, the RFID strap 740 includes an RFID chip 742 as well as one or more contacts 744 that are connected to or capacitively coupled with the plate 710. In various embodiments, the RFID strap 740 can include the RFID strap 740 and a slot antenna formed from the plate 710. In various embodiments, the respective and relative dimensions, spacing, and location of the first Slot 720 and the second slot 730 are configured such that the slot antenna formed from the plate 710, the first slot 720, and the second slot 730 will resonate at multiple desired frequencies. In various embodiments, the slot antenna configured according to FIG. 7A is able to resonate at both a HF (e.g., 13.56 MHz) and a UHF (e.g., 915 MHz) band. As described in more detail below, in other embodiments, instead of multiple slots (e.g., the first slot 720 and the second slot 730 in the plate 710) configured to resonate at several different frequencies, an RFID-enabled license plate can also include a single slot configured to resonate at a single frequency.

Figure 7B:
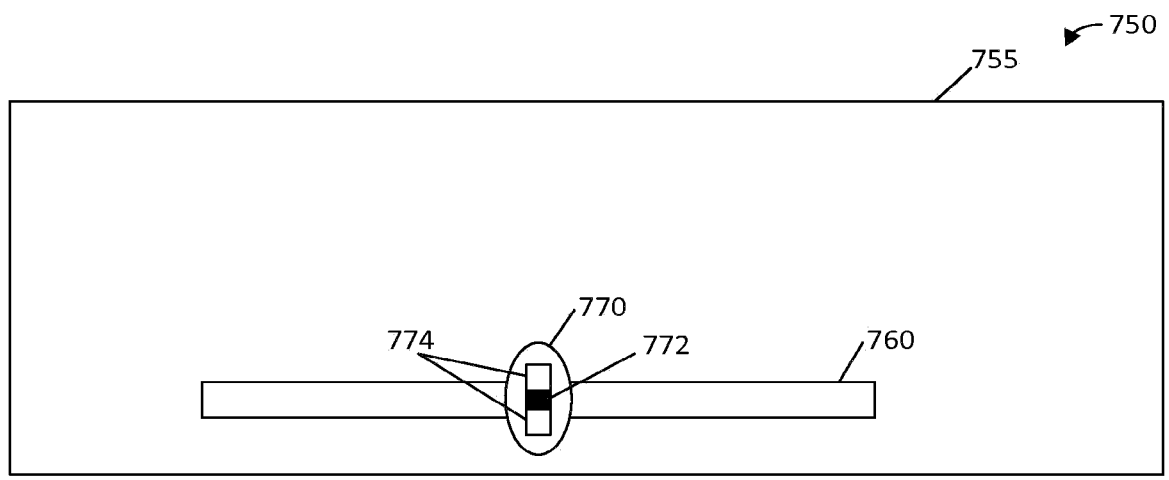
FIG. 7B illustrates the top view of an RFID-enabled license plate according to various embodiments.

FIG. 7B illustrates the top view of an RFID-enabled license plate 750 according to various embodiments. In various embodiments, the RFID-enabled license plate 750 includes a plate 755, which may be constructed out of a metallic material. As shown in FIG. 7B, in various embodiments, the RFID-enabled license plate 750 can be configured to include a single slot 760, which may be cut or punched out of the plate 755. In various embodiments, the slot 760 can be stuffed, extruded, or otherwise deposited with a non-metal material that remains flush with respect to both the front and rear surfaces of the plate 755. In the embodiment shown in FIG. 7B, an RFID strap 770 is positioned over the slot 760. In various embodiments, the RFID strap 770 may include an RFID chip 772 and one or more contacts 774. In various embodiments, the contacts 774 can be connected to the plate 755 using solder, adhesive paste, or both. In some embodiments, the contacts 774 may be capacitively coupled to the plate 755. Depending on the embodiment, the RFID strap 770 may be placed on either the front surface or the rear surface of the plate 755. Configured according to FIG. 7B, the entire plate 755 becomes a slot antenna coupled with the RFID chip 772, which is less sensitive to the detuning effects of a metal car frame.

Figure 7C:
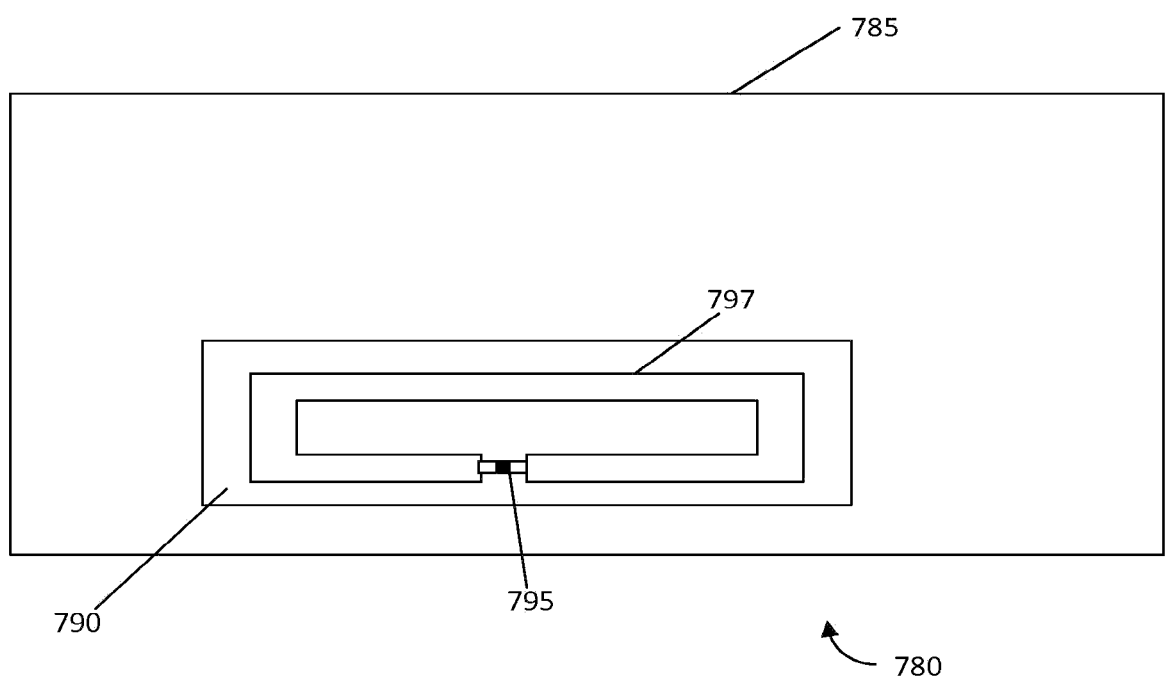
FIG. 7C illustrates the top view of an RFID-enabled license plate according to various embodiments.

FIG. 7C illustrates the top view of an RFID-enabled license plate 780 according to various embodiments. In various embodiments, the RFID-enabled license plate 780 includes a plate 785 having formed thereon a slot 790, which is an open area that has been cut or punched out of the plate 785. In some embodiments, instead of an RFID strap (e.g., the RFID strap 740 described with respect to FIG. 7A and the RFID strap 770 described with respect to FIG. 7B) positioned over the slot 790, an RFID transponder module 792 is placed directly inside of the slot 790 as shown in FIG. 7C. In various embodiments, the RFID transponder module 792 may include an RFID chip 795 that is coupled with a feeding loop 797. Furthermore, as shown in FIG. 7C, in some embodiments, the slot 790 is positioned such that the feeding loop 797 is capacitively coupled with the plate 785. Although not shown, in other embodiments, the feeding loop 797 may also be inductively coupled with the plate 785. Advantageously, the RFID transponder module 792 may be made sufficiently thin such that even when the RFID transponder module 792 is installed within the Slot 790, it creates a substantially planar surface with respect to the plate 785.

In some embodiments, a RFID-enabled license plate can include a transponder that will not function absent a valid and properly positioned vehicle registration sticker. For example, in some embodiments, the transponder can be intentionally tuned to a lower frequency (e.g., less than 915 MHz) and therefore cannot be properly read by a UHF RFID reader. Meanwhile, in some embodiments, applying a valid vehicle registration sticker in the correct position on the RFID-enabled license plate tunes the transponder to the correct and operational frequency (e.g., 915 MHz) so that the transponder can be read by a UHF RFID reader. In various embodiments, the vehicle registration sticker is fabricated from or otherwise includes one or more metallic or other conductive materials.

Figure 8:
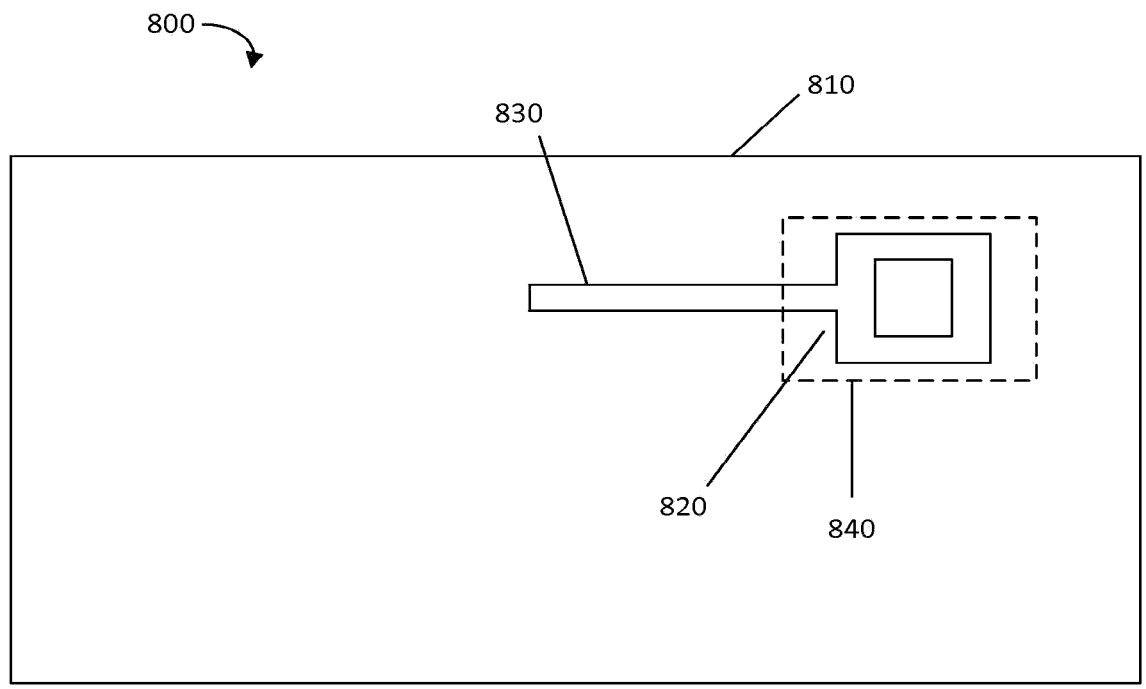
FIG. 8 illustrates the top view of an RFID-enabled license plate according to various embodiments.

FIG. 8 illustrates of the top view of an RFID-enabled license plate 800 according to various embodiments. In various embodiments, RFID-Enabled License Plate 800 includes a plate 810 and an RFID module 820. As shown in FIG. 8, the RFID-enabled license plate 800 may further include an RFID booster 830. In some embodiments, the RFID booster 830 may be a slot antenna formed from the plate 810 and one or more properly sized and positioned slots in the plate 810. In various embodiments, the RFID module 820 may be intentionally tuned to a lower, inoperable frequency. In various embodiments, a valid vehicle registration sticker 840 must be applied in a proper location on the plate 810 in order for the RFID module 820 to function properly (e.g., to be scanned or read by a UHF RFID toll reader). As will be described in more detail below, in one exemplary embodiment, applying the vehicle registration sticker 840 in the correct location on the RFID-enabled license plate 800 tunes the RFID module 820 to the proper frequency band.

Figure 9:
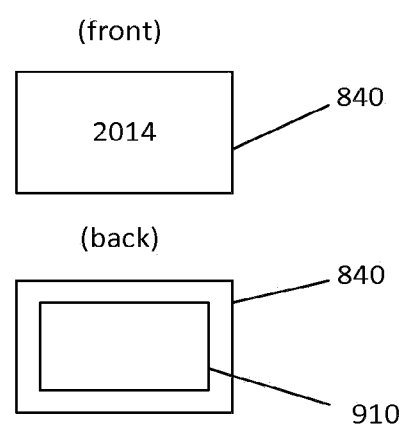
FIG. 9 illustrates a vehicle registration sticker according to various embodiments.

FIG. 9 illustrates vehicle registration sticker 840 according to various embodiments. As shown in FIG. 9, the back of the vehicle registration sticker 840 may include a loop 910. In various embodiments, when the vehicle registration sticker 840 is affixed to an RFID-enabled license plate (e.g., the RFID-enabled license plate 800) in a proper location, the loop 910 may couple to an RFID transponder and tune the RFID transponder to a proper frequency band for operation. In other embodiments, the vehicle registration sticker 840 may include an RFID module (e.g., the RFID module 820). In those embodiments, placement of the vehicle registration sticker on an RFID-enabled license plate (e.g., the RFID-enabled license plate 800) couples the vehicle registration sticker 840 with an RFID booster (e.g., the RFID booster 830). For example, in some embodiments, the vehicle registration sticker 840 can include a single frequency (e.g., HF or NFC) transponder.

Although FIG. 8 shows that the vehicle registration sticker 840 is placed directly over the RFID module 820, in embodiments where the vehicle registration sticker 840 is composed of or otherwise includes conductive material, the RFID module 820 may not be directly underneath the vehicle registration sticker 840.

Typically, in the United States, motorists are required to renew their vehicle registration on an annual basis. For example, California license plates have a month and a year sticker. A properly registered vehicle in California will have been issued a sticker that shows the current year. Although the registration status of a vehicle can be verified visually, in many instances, it would be preferable to verify vehicle registration status through electronic and automated means. Thus, in various embodiments, a vehicle registration sticker that is used in conjunction with a RFID-enabled license plate can further include or be constructed out of a material that gradually degrades as the vehicle's registration approaches expiration. In this manner, an up-to-date vehicle registration sticker is able to tune a RFID transponder in the RFID-enabled license plate to the proper frequency while an expired vehicle registration sticker cannot. Consequently, a vehicle cannot successfully pass through a checkpoint unless the vehicle is also properly registered and is displaying a current vehicle registration sticker.

Vehicle registration stickers are very often made out of a metallic material (e.g., retro-reflective foil). Therefore, in some embodiments, the vehicle registration sticker can be made out of a retro-reflective material that degrades over time. In another embodiment, the loop on the back of the vehicle registration sticker can be made out of a material that degrades over time. Finally, in some embodiments, the adhesive used to bond the vehicle registration sticker to a RFID-enabled license plate can degrade over time.

In various embodiments where a RFID-enabled license plate (e.g., the RFID-enabled license plates 700, 750, 780, and 800) comprises a dual frequency transponder (e.g., the transponder 110, the RFID storage medium 4, and the transponder 400), the RFID-enabled license plate may be able to communicate with a NFC-enabled device and with a UHF RFID reader device. In particular, in various embodiments, the RFID-enabled license plate is designed to be read as a vehicle passes through a toll gate. In various embodiments where the dual frequency transponder is embedded, integrated, or otherwise included in the vehicle's license plate, it would be preferable to install or place the toll readers in the road, rather than in overhead gantries as in conventional ETC systems.

Figure 10:
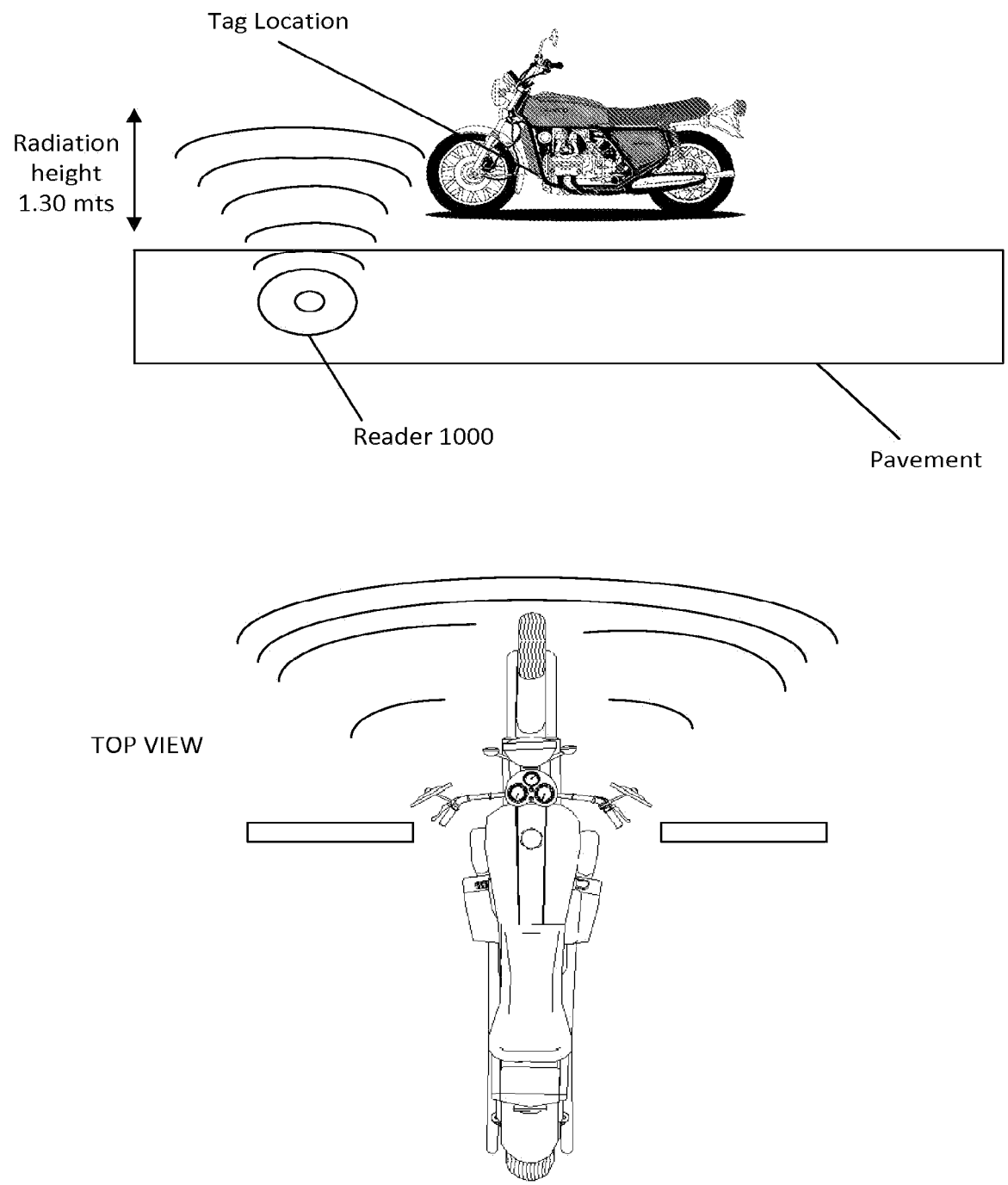
FIG. 10 illustrates an RFID reader according to various embodiments.

FIG. 10 illustrates a reader 1000 according to various embodiments. Advantageously, placing toll readers in a configuration shown in FIG. 10 may greatly reduce the cost of infrastructure associated with ETC since it eliminates the need to build and install gantries above the road. In various embodiments, the maximum height from which a transponder can be read is approximately 3.5 feet above the surface of the pavement. Meanwhile, in various embodiments, the reader 1000 may be embedded at least 4 inches below the surface of the pavement. For various applications including ETC, the transponder in a RFID-enabled license plate may be required to include a 192-bit Tag Identification (TID) memory. As such, in various embodiments, the maximum speed at which the reader 1000 is able to successfully read a dual frequency transponder with a 192-bit TID memory that is embedded in a license plate attached to a passing vehicle is 140 kilometers or 87 miles per hour.

What is claimed:

1. A system for managing an account, comprising:
   a multi-frequency radio frequency identification (RFID) tag configured to operate using a plurality of frequency bands and store information; and
   a mobile device comprising a first RFID reader operating at a first frequency band of the plurality of frequency bands, a first device configured to:
      launch an application installed on the mobile device based the mobile device reading a first portion of information stored in the multi-frequency RFID tag using the first frequency band, the application comprising instructions to access an account corresponding to the multi-frequency RFID tag and modify a balance of the account based on interactions with a virtual wallet,
   wherein an action is performed on the account based on at least a second portion of information stored in the multi-frequency RFID tag read by a second device using a second RFID reader operating at a second frequency band of the plurality of frequency bands.

2. The system of claim 1, wherein, based on launching the application, the first device is configured to prompt a user of the first device to provide one or more forms of authentication credentials.

3. The system of claim 2, wherein the first device is configured to access the rest of the information stored on the multi-frequency RFID tag based on successfully authenticating the provided one or more forms of authentication credentials.

4. The system of claim 2, wherein the one or more forms of authentication credentials includes one or more of a biometric, username, or password.

5. The system of claim 1, wherein the first device is configured to access the account by retrieving account information stored at a remote server based at least on the first portion of the information read from the multi-frequency RFID tag.

6. The system of claim 1, wherein the application is configured to:
   display the balance of the account;
   display one or more options for a user to perform an action with respect to the balance of the account; and
   receive a user selection from the one or more options to perform an action with respect to the balance of the account.

7. The system of claim 1, wherein the first frequency band comprises a high frequency (HF) band or an ultra-high frequency (UHF) band.

8. The system of claim 1, wherein the first RFID reader is configured to read the information stored on the RFID tag using near field communication (NFC).

9. The system of claim 1, wherein the first RFID reader is configured to read the information stored on the RFID tag in response to one or more of touching, tapping, and positioning the first device and the RFID tag within range of each other.

10. The system of claim 1, wherein the account is a toll account, the RFID tag is installed on a vehicle linked to the toll account, and the second device is included as part of a toll device.

11. The system of claim 1, wherein the interactions with a virtual wallet includes receiving masked wallet information of the virtual wallet, requesting full wallet information in response to authenticating a user of the mobile device, and transmitting the full wallet information to a merchant server corresponding to the account.

12. A method of managing an account, comprising:
reading, by a first RFID reader of a mobile device operating at a first frequency band, information stored on a multi-frequency radio frequency identification (RFID) tag;
opening an application installed on the mobile device based the information read by the first RFID reader; and
using the application to access an account corresponding to the multi-frequency RFID tag by the application and modifying a balance of the account based on interactions with a virtual account,
wherein an action is performed on the account based on at least a second portion of information stored in the multi-frequency RFID tag read by a second device using a second RFID reader operating at a second frequency band of the plurality of frequency bands.

13. The method of claim 12, wherein the first device reads a portion of information stored in the multi-frequency RFID tag, the method further comprising:

prompting a user of the first device to provide one or more forms of authentication credentials based on opening the application; and
accessing the rest of the information stored on the multi-frequency RFID tag by the first device based on successfully authenticating the provided one or more forms of authentication credentials.

14. The method of claim 12, further comprising using the application to:
display the balance of the account;
display one or more options for a user to perform an action with respect to the balance of the account; and
receive a user selection from the one or more options to perform an action with respect to the balance of the account.

15. The method of claim 12, wherein the first RFID reader is configured to read the information stored on the RFID tag in response to one or more of touching, tapping, and positioning the first device and the RFID tag within range of each other.

16. The method of claim 12, wherein the account is a toll account, the RFID tag is installed on a vehicle linked to the toll account, and the second device is included as part of a toll device.

17. The method of claim 12, further comprising using the application to:
receive masked wallet information of the virtual wallet;
prompt a user of the first device to provide authentication credentials in response to receiving the masked wallet information;
in response to successfully authenticating the user, request full wallet information; and
transmit the full wallet information to a merchant server corresponding to the account.

* * * * *